US012158383B2

(12) United States Patent
Kasai et al.

(10) Patent No.: US 12,158,383 B2
(45) Date of Patent: Dec. 3, 2024

(54) PACKAGE-TYPE FLOW SENSOR

(71) Applicant: MMI SEMICONDUCTOR CO., LTD., Tokyo (JP)

(72) Inventors: Takashi Kasai, Kyoto (JP); Hiroaki Sadohara, Kyoto (JP); Katsuyuki Yamamoto, Kyoto (JP); Kenta Kajikawa, Kyoto (JP)

(73) Assignee: MMI SEMICONDUCTOR CO., LTD., Tokyo (JP)

( * ) Notice: Subject to any disclaimer, the term of this patent is extended or adjusted under 35 U.S.C. 154(b) by 248 days.

(21) Appl. No.: 17/905,667

(22) PCT Filed: Dec. 15, 2020

(86) PCT No.: PCT/JP2020/046685
§ 371 (c)(1),
(2) Date: Sep. 6, 2022

(87) PCT Pub. No.: WO2021/181781
PCT Pub. Date: Sep. 16, 2021

(65) Prior Publication Data
US 2023/0110107 A1    Apr. 13, 2023

(30) Foreign Application Priority Data

Mar. 10, 2020   (JP) .................................. 2020-040837

(51) Int. Cl.
*G01L 19/00*   (2006.01)

(52) U.S. Cl.
CPC ...... *G01L 19/0084* (2013.01); *G01L 19/0007* (2013.01)

(58) Field of Classification Search
CPC ............. G01L 19/0084; G01L 19/0007; G01F 1/6888; G01F 1/6845; G01F 1/696
See application file for complete search history.

(56) References Cited

U.S. PATENT DOCUMENTS 8,677,818 B2    3/2014  Landsberger et al.
10,168,195 B2 *  1/2019  Morino ..................... G01F 5/00
(Continued)

FOREIGN PATENT DOCUMENTS

EP    2693172        2/2014
EP    2693172 A1 *  2/2014    ........... G01F 1/6842
(Continued)

OTHER PUBLICATIONS

International Search Report for PCT/JP2020/046685 mailed on Mar. 2, 2021.
(Continued)

*Primary Examiner* — Francis C Gray
(74) *Attorney, Agent, or Firm* — IPUSA, PLLC

(57) ABSTRACT

A package-type flow sensor includes a flow sensor chip having a sensor part configured to detect a flow of fluid, a package including a flat board part, forming an accommodating chamber configured to accommodate the flow sensor chip, and a connection terminal, provided on an outer surface of the board part, and connected to an external board. Further, in this package-type flow sensor, the board part is provided with a first vent hole communicating to inside and outside of the accommodating chamber, the package is provided with a second vent hole communicating to the inside and the outside of the accommodating chamber, at a position different from the board part, and the flow sensor chip is disposed on a flow passage of the fluid formed by the first vent hole and the second vent hole.

7 Claims, 16 Drawing Sheets

(56) References Cited

U.S. PATENT DOCUMENTS

| | | | | |
|---|---|---|---|---|
| 2012/0161256 A1* | 6/2012 | Grudin | ............... | G01F 1/6888 257/E29.324 |
| 2014/0069205 A1 | 3/2014 | Yamamoto et al. | | |
| 2014/0105790 A1* | 4/2014 | Gaudon | ............... | G01N 27/16 422/90 |

FOREIGN PATENT DOCUMENTS

| | | | | |
|---|---|---|---|---|
| JP | 2012-233776 | 11/2012 | | |
| JP | 2018-004661 | 1/2018 | | |
| JP | 2021139861 A * | 9/2021 | ........... | G01F 1/6842 |
| WO | 2010/102403 | 9/2010 | | |
| WO | 2019/120990 | 6/2019 | | |
| WO | WO-2020175283 A1 * | 9/2020 | | |

OTHER PUBLICATIONS

Extended European Search Report mailed on Jun. 5, 2023 with respect to the corresponding European patent application No. 20924215.5.

* cited by examiner

PACKAGE-TYPE FLOW SENSOR

TECHNICAL FIELD

The present invention relates to package-type flow sensors.

BACKGROUND ART

Flow sensors are utilized to detect a flow rate, a flow velocity, and a flow direction of fluids. The flow sensor includes a heater provided on a thin film (membrane), and a sensor part having thermopiles disposed so as to sandwich the heater, for example. In the flow sensor having such a sensor part, when a heat distribution generated by heating of the thin film by the heater is disturbed by a flow of fluid, the disturbance is measured as a difference between thermal electromotive forces generated by the thermopiles. Because the sensor part utilizes the membrane, the sensor part may be regarded as being a component that is easily damaged due to physical contact or the like.

For example, Patent Document 1 discloses a flow sensor that is integrally formed with a flow passage through which the fluid passes. Patent Document 2 discloses a flow sensor that is formed as a body separate from the flow passage, and having the sensor part for detecting the flow velocity exposed to the outside. The flow sensor disclosed in Patent Document 2 is mounted in the flow passage, and the flow rate is detected according to a cross sectional area of the flow passage.

PRIOR ART DOCUMENTS

Patent Documents

Patent Document 1: Japanese Patent No. 5652315
Patent Document 2: Japanese Patent No. 6435389

DISCLOSURE OF THE INVENTION

Problem to be Solved by the Invention

Because the flow sensor disclosed in Patent Document 1 is integrally formed with the flow passage, it is difficult to reduce the size of the flow sensor, and a manufacturing cost of the flow sensor becomes high. The flow sensor disclosed in Patent Document 2 is formed as the body separate from the flow passage, the size of the flow sensor can be reduced with ease. However, because the flow sensor disclosed in Patent Document 2 has the sensor part for detecting the flow velocity exposed to the outside, the sensor part is easily damaged due to the physical contact or the like, thereby making the flow sensor difficult to handle.

Hence, a package-type flow sensor, that protects the sensor part by accommodating the flow sensor inside a package, is conceivable. The package-type flow sensor is used in a state connected to an external board. This package-type flow sensor cannot detect a flow of fluid in a thickness direction of the external board.

An object according to one aspect of the present disclosure is to provide a package-type flow sensor that can detect a flow of fluid in a thickness direction of an external board.

Means of Solving the Problem

One aspect of the disclosed technique provides the following package-type flow sensor, for example. This package-type flow sensor includes a flow sensor chip having a sensor part configured to detect a flow of fluid, a package including a flat board part, forming an accommodating chamber configured to accommodate the flow sensor chip, and a connection terminal, provided on an outer surface of the board part, and connected to an external board. Further, in this package-type flow sensor, the board part is provided with a first vent hole communicating to inside and outside of the accommodating chamber, the package is provided with a second vent hole communicating to the inside and the outside of the accommodating chamber, at a position different from the board part, and the flow sensor chip is disposed on a flow passage of the fluid formed by the first vent hole and the second vent hole.

The sensor part of the flow sensor chip is mounted with micro components for detecting a flow velocity of the fluid on a surface of the sensor part, and the sensor part is easily damaged due to physical contact or the like. The disclosed technique can protect the sensor part of the flow sensor chip from physical contact or the like by accommodating the flow sensor chip inside the package, thereby facilitating handling of the flow sensor. In addition, because this package-type flow sensor is not integrally formed with a flow passage, the size of the package-type flow sensor can easily be reduced compared to the flow sensor integrally formed with the flow passage. Because the package itself has a small size, even in a case where this package-type flow sensor is assembled to the flow passage that is formed as a separate body so as to detect a flow rate from the detected flow velocity, it is possible to improve a degree of freedom with which the package-type flow sensor is mounted with respect to the flow passage, and reduce the size of a structure of the package-type flow sensor even if the flow passage were included in this structure.

Because the first vent hole, the second vent hole, and the accommodating chamber form the flow passage for guiding the fluid to the flow sensor chip, the fluid introduced into the accommodating chamber passes above the sensor part. Because the flow passage guides the fluid to the sensor part, a deterioration of a fluid detection accuracy can be reduced, even when the flow sensor chip is accommodated inside the package.

In this package-type flow sensor, the connection terminal, connected to the external board, is provided on the outer surface of the board part. In addition, the first vent hole is provided in the board part, and the second vent hole is provided at a position other than the board part. That is, in this package-type flow sensor, the first vent hole is provided in the surface on the side connected to the external board, and the second vent hole is provided at a position not facing the external board. For this reason, this package-type flow sensor can discharge the fluid, that is introduced into the accommodating chamber from one of the first vent hole and the second vent hole, from the other of the first vent hole and the second vent hole, without being blocked by the external board. This flow sensor package employing such a configuration can cause the sensor chip to detect the flow of fluid in a normal direction to the external board (thickness direction of the external board).

The disclosed technique may include the following features. The connection terminal may be formed to surround a periphery of the first vent hole. By surrounding the first vent hole by the connection terminal, the first vent hole can be surrounded by a solder or the like when mounting this flow sensor package on the external board. For this reason, by providing a through hole in the external board at a position corresponding to the first vent hole, it is possible to efficiently introduce the fluid in the normal direction to the external board (thickness direction of the external board) into the accommodating chamber.

The disclosed technique may include the following features. This package-type flow sensor may be placed on the external board, the external board may be provided with a through hole at a position corresponding to an area surrounded by the connection terminal, and the fluid may be guided from a surface of the external board opposite to a surface of the external board on which the package-type flow sensor is placed, to the accommodating chamber, via the through hole and the first vent hole.

The disclosed technique may include the following features. This package-type flow sensor may be placed on a surface of the external board identical to a surface to which an electronic component is connected. By providing such a feature, it is possible to reduce a disturbance in the flow of fluid from the surface of the external board opposite to the surface of the external board on which the package-type flow sensor is mounted. For this reason, this package-type flow sensor can increase the detection accuracy of the flow of fluid from the surface of the external board opposite to the surface of the external board on which the package-type flow sensor is mounted.

The disclosed technique may include the following features. The package may include a case member forming a hollow part opening to an outside by a top plate and sidewalls extending from an edge of the top plate, the accommodating chamber may be formed by closing the opening by the board part, and the second vent hole may be provided in the case member. In the disclosed technique, the second vent hole may be provided in the top plate, or may be provided in the sidewall. For example, in a case where the second vent hole is provided in the sidewall, it is possible to easily hold the sensor package when mounting the flow sensor package on the external board.

The disclosed technique may include the following features. A charge pump configured to boost and supply a voltage supplied from outside to the flow sensor chip, or an amplifier configured to amplify an output of the flow sensor chip, may further be accommodated in the accommodating chamber. By providing such a feature, it is possible to reduce a noise mixing into an interconnect between the sensor chip and the charge pump or the amplifier. As a result, it is possible to improve a performance of the package-type flow sensor.

Effects of the Invention

According to the package-type flow sensor, it is possible to detect a flow of fluid in a thickness direction of the external board.

MODE OF CARRYING OUT THE INVENTION

Figure 1:
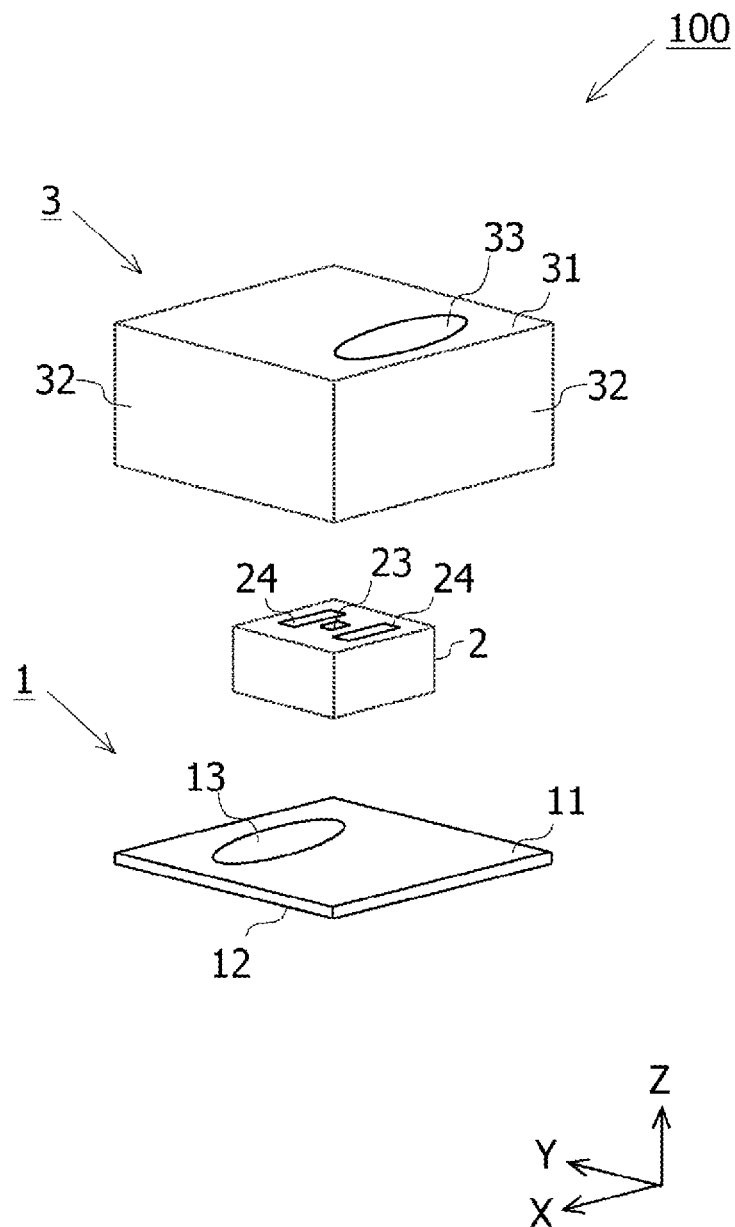
FIG. 1 is a disassembled perspective view of a sensor package according to one embodiment.

The sensor package according to one embodiment will be described in the following, by referring to the drawings. FIG. 1 is a disassembled perspective view of a sensor package according to one embodiment. A sensor package 100 illustrated in FIG. 1 includes a board 1, a flow sensor chip 2, and a lid 3. In this specification, the side provided with the board 1 is referred to as a lower side, and the side provided with the lid 3 is referred to as an upper side. In this specification, a direction along one side of the board 1 that is formed to a flat shape may also be referred to as an X-direction, a direction along the other side may also be referred to as a Y-direction, and an up-and-down direction may also be referred to as a Z-direction. The sensor package 100 is an example of "a package-type flow sensor".

(Flow Sensor Chip 2)

Figure 2:
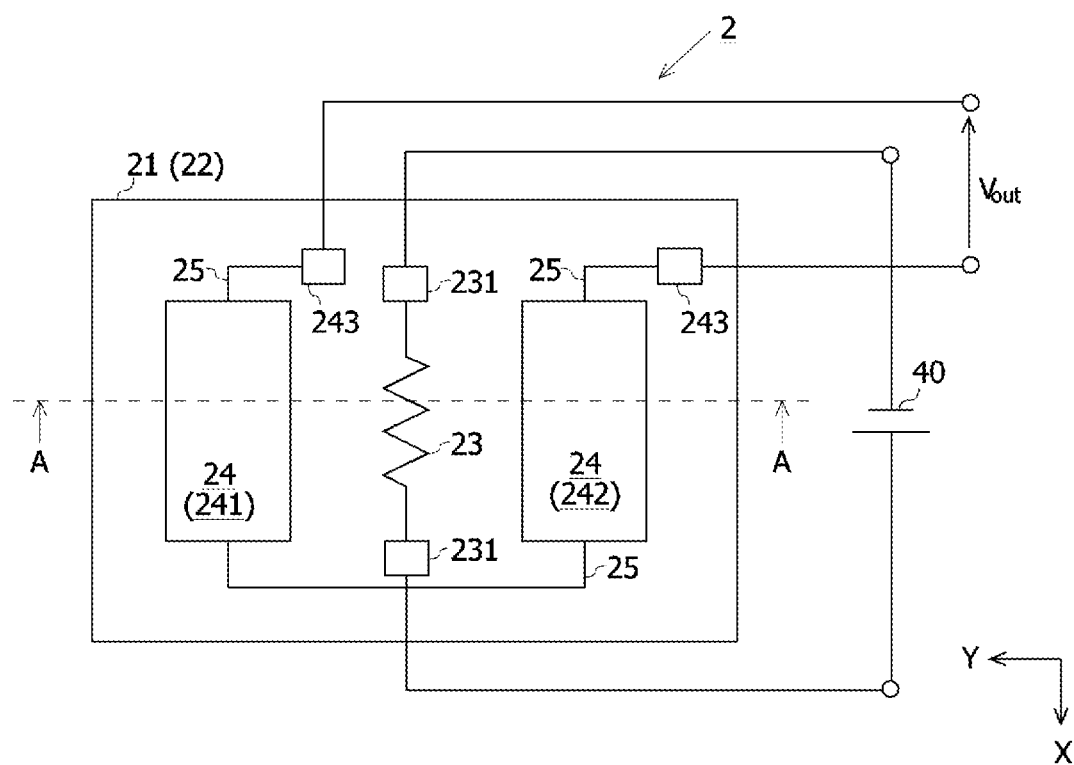
FIG. 2 is a diagram illustrating a flow sensor chip viewed from a top surface thereof.
Figure 3:
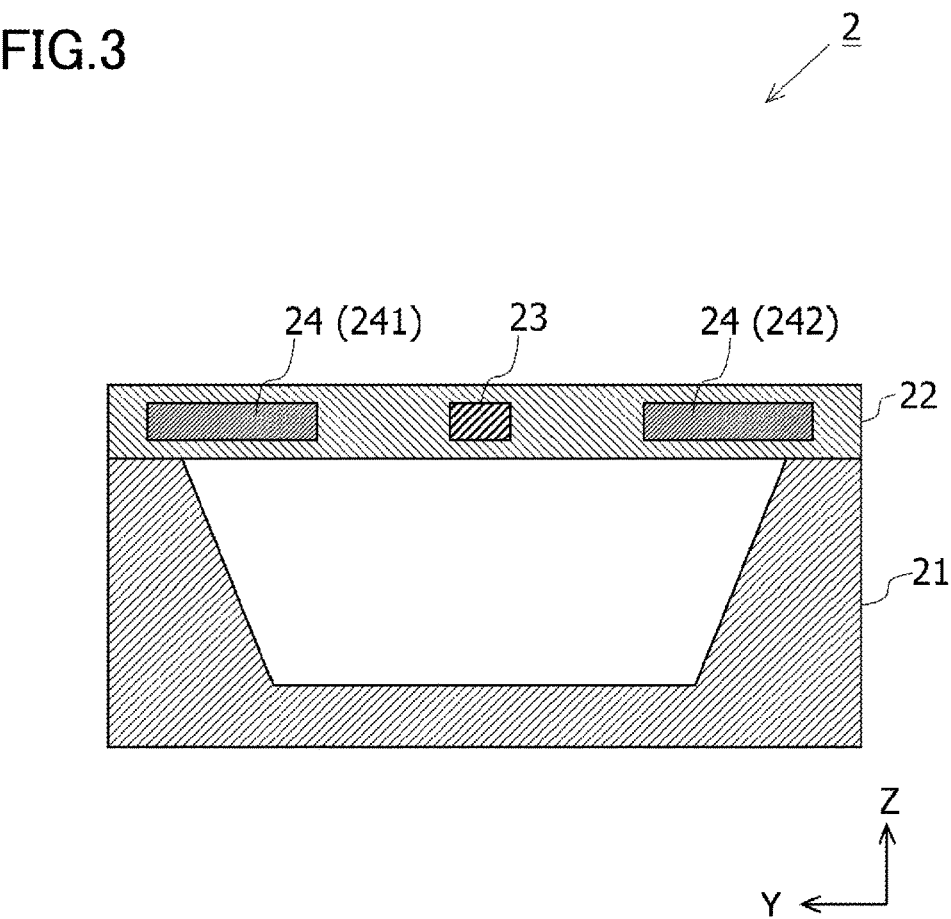
FIG. 3 is a cross sectional view along a line A-A in FIG. 2.

The flow sensor chip 2 is a sensor for measuring a flow velocity of a fluid (for example, a gas). FIG. 2 is a diagram illustrating the flow sensor chip viewed from a top surface thereof, and FIG. 3 is a cross sectional view along a line A-A in FIG. 2. The flow sensor chip 2 includes a main body 21, and a membrane 22. The main body 21 is formed to a hollow shape (mortar shape) that opens at a top surface thereof, and a material used for the main body 21 is silicon, for example. The membrane 22 is a thin film, and as illustrated in FIG. 3, the membrane 22 forms a hollow structure together with the main body 21 having the opening. A heater 23, and thermopiles 24 and 24 are provided in the membrane 22. The heater 23 and the thermopiles 24 and 24 are arranged in a row along the Y-direction. A contact at one end of each of the thermopiles 24 and 24 is disposed at a position overlapping the main body 21. When distinguishing each of the thermopiles 24 and 24, one of the thermopiles 24 and 24 will be referred to as a thermopile 241, and the other of the thermopiles 24 and 24 will be referred to as a thermopile 242.

The heater 23 is a heater for heating the membrane 22. Because the membrane 22 is a thin film having a small heat capacity, the membrane 22 can be heated efficiently by the heater 23. The thermopiles 24 and 24 are thermocouples that generate thermal electromotive forces in response to receiving heat from the membrane 22. Because the contact at one end of each of the thermopiles 24 and 24 is provided on the main body 21, a temperature difference between the membrane 22 and the main body 21 can be detected as a thermal electromotive force. The higher the temperature becomes, the higher the thermal electromotive forces generated by the thermopiles 24 and 24 become. In addition, in a case where the temperatures of the thermopiles 24 and 24 are the same, the thermal electromotive forces generated by the thermopiles 24 and 24 become the same. The flow sensor chip 2 is a thermal flow sensor for measuring a flow rate based on a difference between the thermal electromotive forces generated by the thermopiles 24 and 24 due to a difference in a heat distribution of the membrane 22, by heating the membrane 22 by the heater 23, for example. The flow sensor chip 2 is manufactured as Micro Electro Mechanical Systems (MEMS), for example.

Fed terminals 231 and 231, connected to both ends of the heater 23, for receiving power to the heater 23 from an external power supply 40, are also provided on the membrane 22 of the flow sensor chip 2. Moreover, measured terminals 243 and 243 for measuring a difference $V_{out}$ between the thermal electromotive forces generated by the respective thermopiles 24 and 24, are also provided on the membrane 22. The thermopiles 24 and 24 and the measured terminals 243 and 243 are connected in series by interconnects 25. The flow sensor chip is a surface mount flow sensor having the membrane 22, provided with the heater 23 and the thermopiles 24 and 24, that is exposed to an outside, for example. The membrane 22, the heater 23, and the thermopiles 24 and 24 form an example of "a sensor part".

Figure 4:
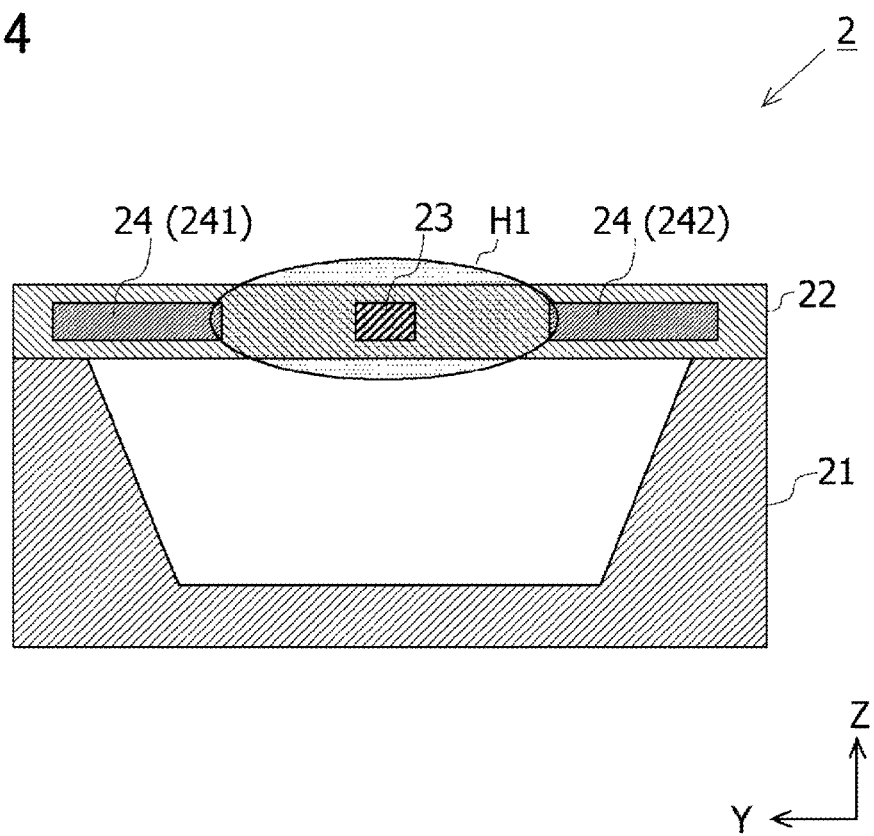
FIG. 4 is a first diagram schematically illustrating a fluid velocity measuring method of the flow sensor chip.
Figure 5:
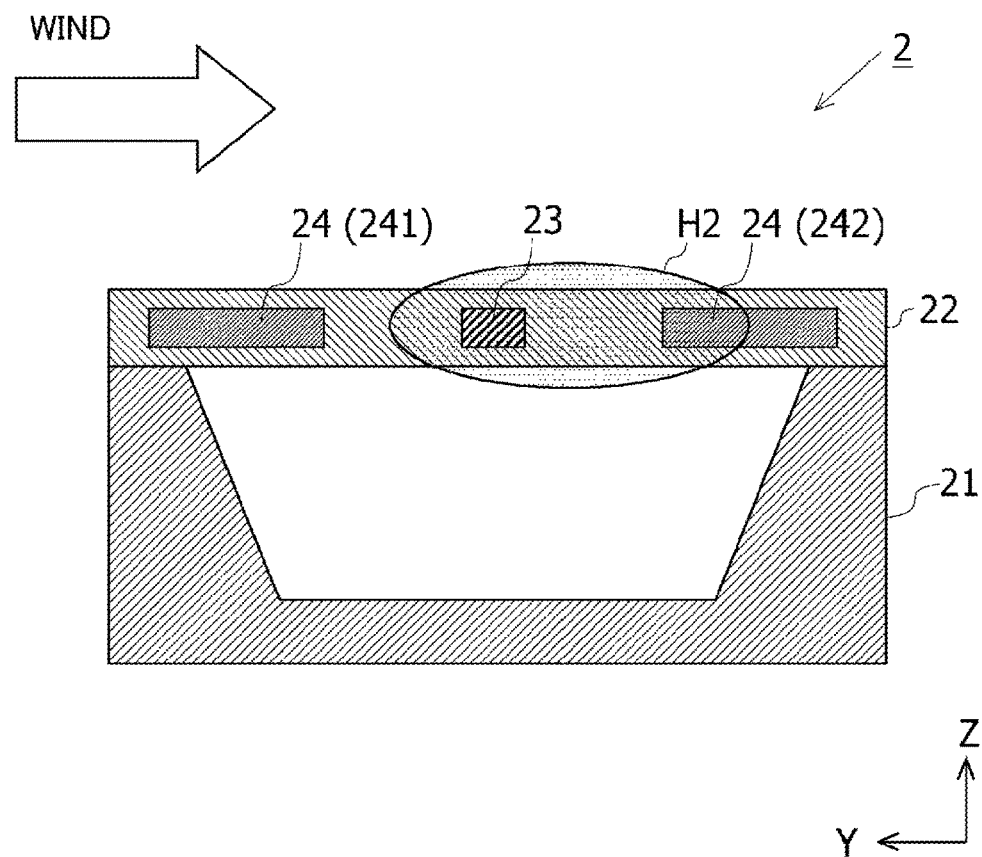
FIG. 5 is a second diagram schematically illustrating the fluid velocity measuring method of the flow sensor chip.

FIG. 4 and FIG. 5 are diagrams schematically illustrating a fluid velocity measuring method of the flow sensor chip. FIG. 4 illustrates an example of a state where no wind blows in a periphery of the flow sensor chip 2. In a case where no wind blows in the periphery of the flow sensor chip 2, a temperature decreases as a distance of a position from the heater 23 increases, and as illustrated by an example of a heat distribution H1, the heat distribution of the membrane 22 becomes balanced with respect to the heater 23 as a center. For this reason, the thermopiles 24 and 24 are respectively heated to the same temperature by the heater 23, and the thermal electromotive forces generated by the thermopiles 24 and 24 become the same.

FIG. 5 illustrates an example of a state where the wind blows in the periphery of the flow sensor chip 2. When one of the thermopiles 24 and 24 is represented as the thermopile 241, and the other of the thermopiles 24 and 24 is represented as the thermopile 242, FIG. 5 illustrates the state where the wind blows in a direction from the thermopile 241 toward the thermopile 242. An upstream side of the wind is cooled by the wind to decrease the temperature, and as illustrated by an example of a heat distribution H2, the heat distribution of the membrane 22 shifts from the upstream side toward a downstream side of the heater 23 (the temperature becomes higher on the downstream side than on the upstream side). For this reason, the temperature of the thermopile 242 located on the downstream side of the heater 23 becomes higher than the temperature of the thermopile 241 located on the upstream side of the heater 23. As a result, a difference is generated between a thermal electromotive force $V_1$ generated by the thermopile 241 and a thermal electromotive force $V_2$ generated by the thermopile 242.

As described above, the thermal electromotive forces of the thermopiles 24 and 24 become higher as the temperature becomes higher, and the temperature of the thermopile 24 located on the downstream side of the wind becomes higher than the temperature of the thermopile 24 located on the upstream side of the wind. For this reason, by measuring the difference (that is, $V_2-V_1$) between the thermal electromotive force $V_1$ of the thermopile 241 and the thermal electromotive force $V_2$ of the thermopile 242, the flow sensor chip 2 can detect a direction of the wind, and also detect an intensity of the wind.

In a case where $V_2-V_1$ is positive, the temperature of the thermopile 242 is higher than that of the thermopile 241, and the flow sensor chip 2 can detect that the wind is blowing in the direction from the thermopile 241 toward the thermopile 242. In addition, in a case where $V_2-V_1$ is negative, the temperature of the thermopile 241 is higher than that of the thermopile 242, and the flow sensor chip 2 can detect that the wind is blowing in the direction from the thermopile 242 toward the thermopile 241. Further, in a case where $V_2-V_1$ is 0 (zero), the temperatures of the thermopiles 24 and 24 are the same, and the flow sensor chip 2 can detect that no wind is blowing (or the blowing wind is less than a lower limit of a detection range). Moreover, the flow sensor chip 2 can detect that the blowing wind is stronger as a value of $V_2-V_1$ becomes larger. The flow sensor chip 2 is an example of "a sensor chip". In this example, the thermopile 24 is a temperature detecting element that detects the heat of the heater 23, however, the sensor chip may be a resistance thermometer sensor that uses a diode, a thermistor, platinum, or the like as the temperature detecting element.

(Lid 3)

The lid 3 is a cover that covers the flow sensor chip 2 from above the flow sensor chip 2. The lid 3 in the example illustrated in FIG. 1 is formed to a hollow parallelepiped shape by a top plate 31, and sidewalls 32 extending from an edge of the top plate 31. The lid 3 may be formed to a box shape that opens toward the board 1. The lid 3 can accommodate the flow sensor chip 2 in a hollow region thereof. A vent hole 33, that penetrates the top plate 31 in a thickness direction, is provided in the top plate 31 of the lid 3. The vent hole 33 is an example of "a second vent hole".

In the example illustrated in FIG. 1, the lid 3 is formed to the hollow parallelepiped shape that opens at a bottom surface thereof, but the shape of the lid 3 is not limited to the parallelepiped shape, and may have a cylindrical column shape or a polygonal column shape, such as a pentagonal prism shape or the like. The lid 3 may have any shape as long as the flow sensor chip 2 is accommodatable inside a hollow region thereof. A material used for the lid 3 is not particularly limited, and any material may be used as long as the material has a rigidity capable of protecting the accommodated sensor chip 2 from external shock or the like, and is capable of forming the flow passage inside the package. The lid material may be selected from metals, plastics, ceramics, silicon, or the like. In a case where the lid 3 is made of a conductive material such as a metal or the like, advantages, such as immunity to electromagnetic noise, can be obtained. The lid 3 is an example of "a case member".
(Board 1)

The board 1 is a flat board having one surface (surface opposing the opening in the lid 3) on which the flow sensor chip 2 is placed. The board 1 may have a connection terminal that connects the flow sensor chip 2 and the external board, for example. The board 1 may be a printed circuit board or a ceramic circuit board. In addition, the board 1 may be a rigid board or a flexible board. In FIG. 1, the board 1 has a rectangular flat shape, but the shape of the board 1 is not limited to such a shape. The board 1 may be formed to other shapes, such as a circular shape, a triangular shape, a pentagonal shape, or the like. The board 1 is preferably formed to a shape capable of covering the entire opening of the lid 3. A vent hole 13, that penetrates the board 1 in a thickness direction, is provided in the board 1. An accommodating chamber for accommodating the flow sensor chip 2 is formed by closing the opening of the lid 3 by the board 1. The vent hole 13 is an example of "a first vent hole".

Figure 6:
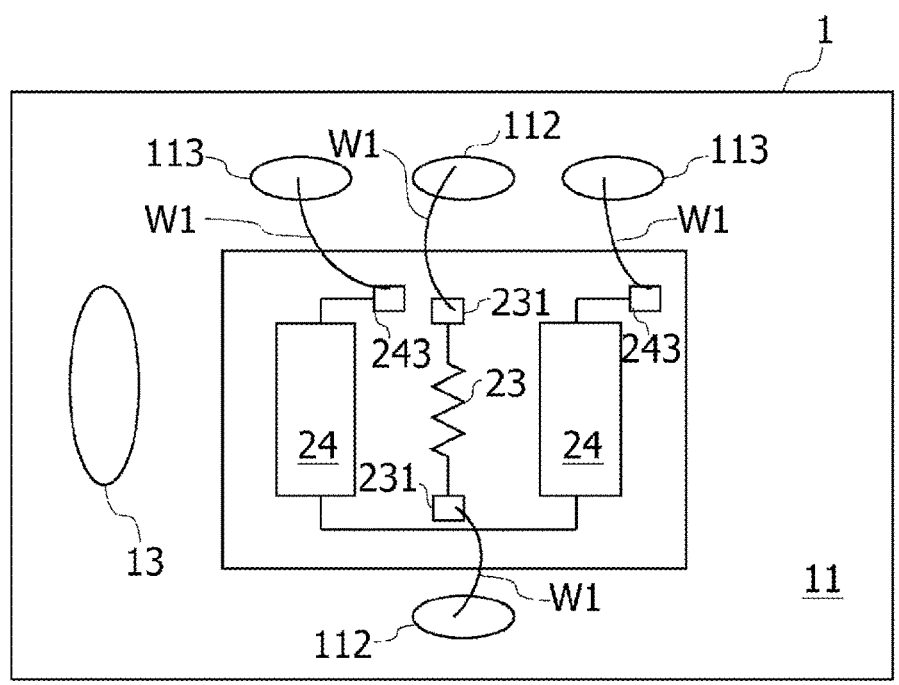
FIG. 6 is a diagram illustrating a board of the sensor package according to the embodiment viewed from above.
Figure 7:
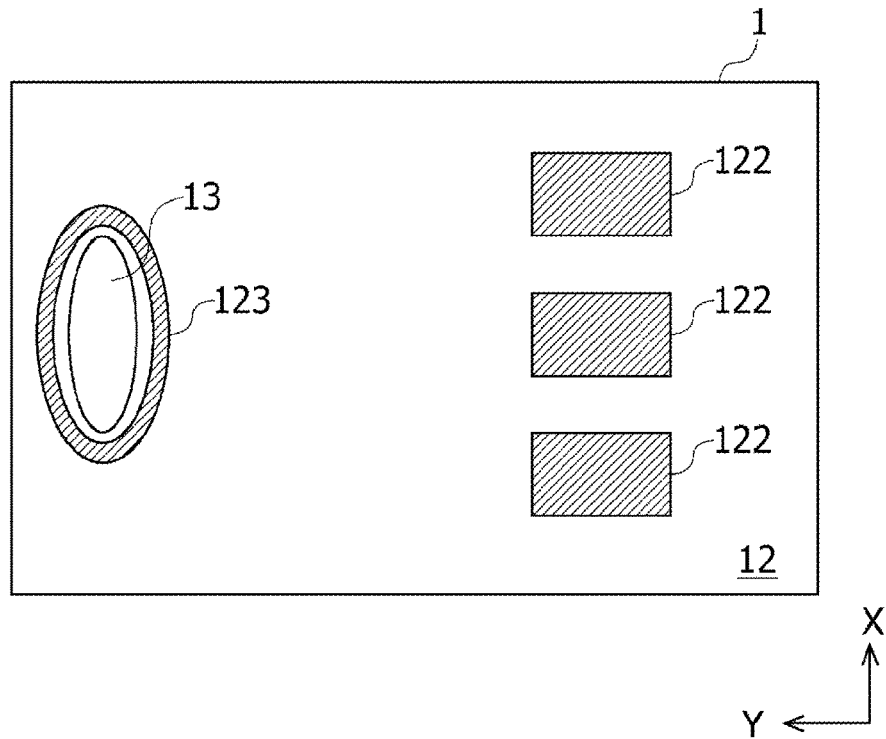
FIG. 7 is a diagram illustrating the board of the sensor package according to the embodiment viewed from below.

FIG. 6 is a diagram illustrating the board of the sensor package according to the embodiment viewed from above, and FIG. 7 is a diagram illustrating the board of the sensor package according to the embodiment viewed from below. FIG. 6 also illustrates the flow sensor chip 2 that is placed on a front surface 11 of the board 1. The board 1 includes, on the front surface 11 thereof, feeding terminals 112 and 112 that electrically connect to the fed terminals 231 and 231 of the flow sensor chip 2, and measuring terminals 113 and 113 that electrically connect to the measured terminals 243 and 243 of the flow sensor chip 2. The fed terminals 231 and 231 of the flow sensor chip 2 and the feeding terminals 112 and 112, and the measured terminals 243 and 243 of the flow sensor chip 2 and the measuring terminals 113 and 113 are connected by wire bonding using metal wires W1, for example. The metal wires W1 are made of gold, for example. In addition, the board 1 includes, on a back surface 12 thereof, lands 122, 122, 122, and 123 that electrically connect to the feeding terminals 112 and 112 and the measuring terminals 113 and 113 provided on the front surface 11. The land 123 is arranged so as to surround the vent hole 13 at the back surface 12 of the board 1. The board 1 is an example of "a board part". The lid 3 and the board 1 form an example of "a package". The back surface 12 of the board 1 is an example of "an outer surface of the board part". The lands 122, 122, 122, and 123 form an example of "a connection terminal".
(Wind Flow)

Figure 8:
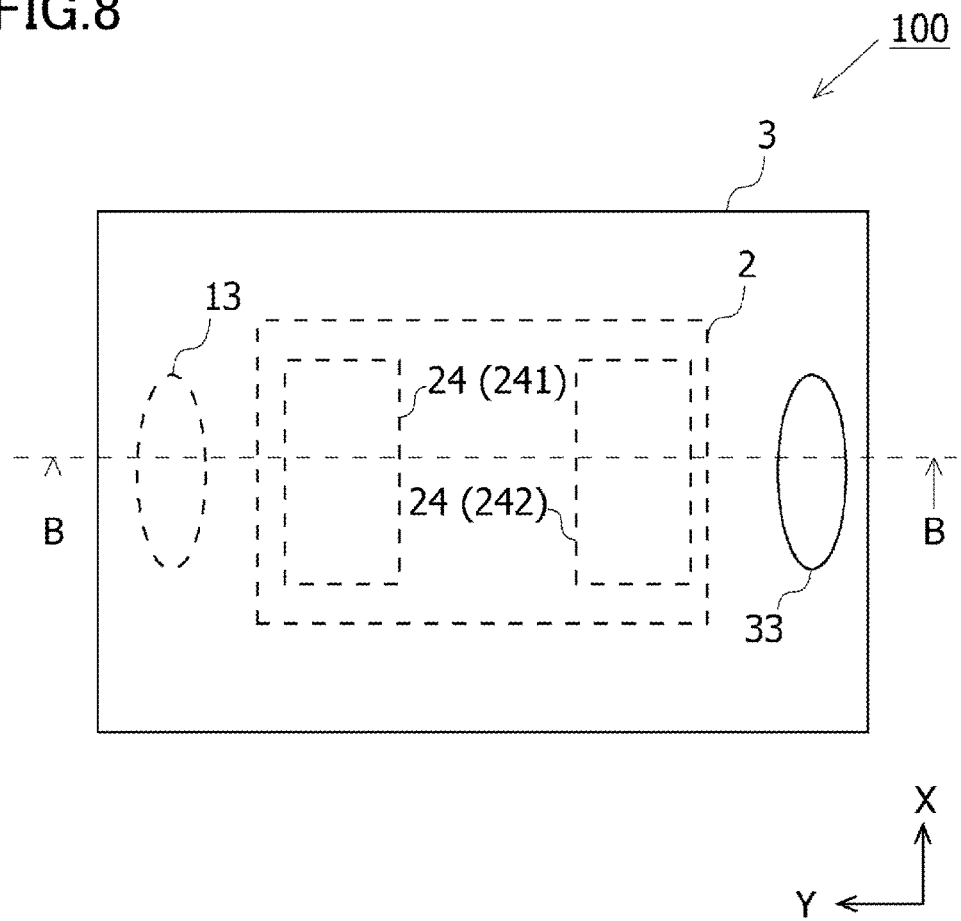
FIG. 8 is a diagram illustrating a plan view of the sensor package according to the embodiment.
Figure 9:
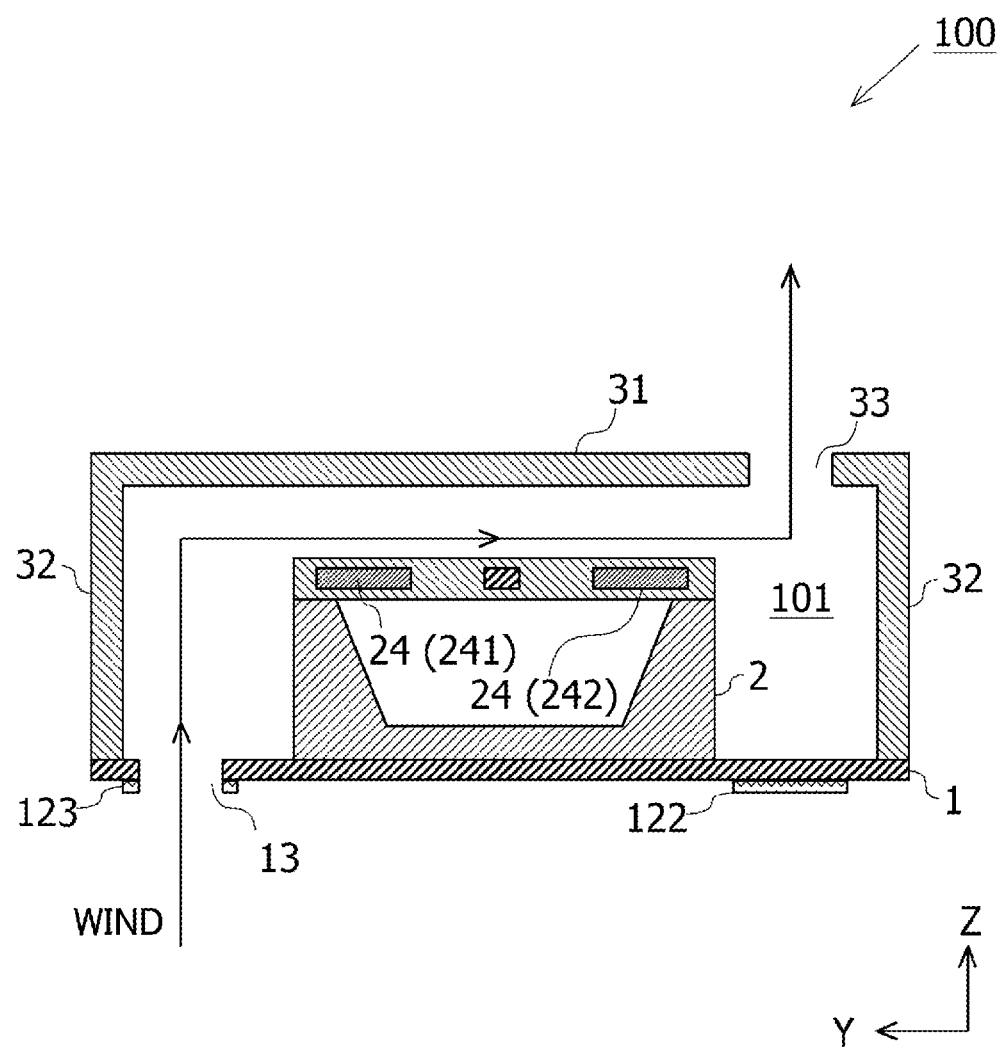
FIG. 9 is a diagram schematically illustrating a flow of air introduced from a vent hole, in the sensor package according to the embodiment.

FIG. 8 is a diagram illustrating a plan view of the sensor package according to the embodiment. FIG. 9 is a diagram schematically illustrating a flow of air introduced from the vent hole, in the sensor package according to the embodiment. FIG. 9 is a cross sectional view along a line B-B in FIG. 8. FIG. 8 illustrates the flow sensor chip 2 accommodated inside the lid 3, the thermopiles 24 and 24 provided on the top surface of the flow sensor chip 2, and the vent hole 13 provided in the board 1 by a dashed line. The vent hole 13 is a hole penetrating the board 1 in the thickness direction. The vent hole 33 is provided at a top surface of the lid 3. The vent hole 33 is a hole penetrating the top surface of the lid 3 in the thickness direction. The vent hole 13 and the vent hole 33 may be regarded as through holes communicating an accommodating chamber 101 that accommodates the flow sensor chip 2 of the sensor package 100 to the outside. As may be seen by referring to FIG. 8, in the plan view of the sensor package 100 viewed from above the sensor package 100, the flow sensor chip 2 is accommodated inside the lid 3 at a position between the vent hole 13 and the vent hole 33. As a result, the vent hole 13, the thermopile 241, the thermopile 242, and the vent hole 33 are arranged side by side in a row in this order along the Y-direction.

When the vent hole 13, the vent hole 33, and the thermopiles 24 and 24 are arranged side by side in this manner, the air introduced from the vent hole 13 into the lid 3 as illustrated in the example illustrated in FIG. 9 passes above the two thermopiles 24 and 24, and is discharged to the outside from the vent hole 33. That is, the vent hole 13 provided in the board 1, the vent hole 33 provided in the top surface of the lid 3, and the accommodating chamber 101 can form the flow passage for passing the wind above the two thermopiles 24 and 24. In other words, the flow sensor chip 2 is disposed on the flow passage formed by the vent hole 13, the vent hole 33, and the accommodating chamber 101. When the air is introduced from the vent hole 33 into the lid 3, the pair passes above the two thermopiles 24 and 24, and is discharged to the outside from the vent hole 13. For the sake of convenience, FIG. 9 illustrates the wind in one direction by an arrow, however, it is possible to actually detect the flow of fluid from the vent hole 13 to the vent hole 33, and the flow of fluid from the vent hole 33 to the vent hole 13. As described above, the flow sensor chip 2 can detect the wind by distinguishing the wind direction according to whether a potential difference between the thermal electromotive forces of the thermopiles 24 and 24 is positive or negative.
(Mounted Examples)

Figure 10:
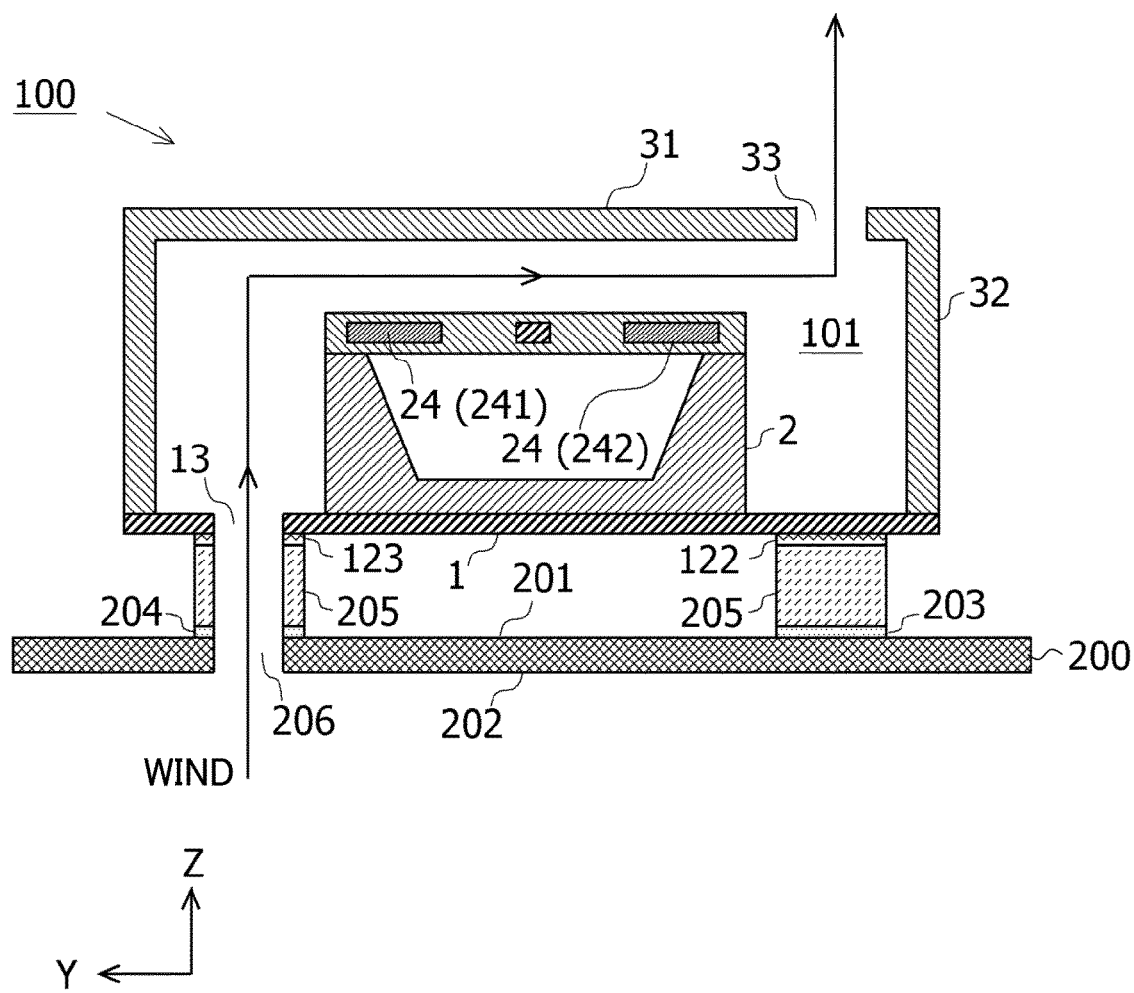
FIG. 10 is a diagram illustrating an example of a state where the sensor package according to the embodiment is mounted on an external board.

FIG. 10 is a diagram illustrating an example of a state where the sensor package according to the embodiment is mounted on the external board. In FIG. 10, the sensor package 100 is provided on a front surface 201 of a board 200 on which an electronic component is mounted. A through hole 206, that penetrates the board 200 in a thickness direction, is provided at a position corresponding to a sleeve defined by the land 123 of the sensor package 100. In addition, a land 204 is provided on the front surface 201 of the board 200, so as to surround a periphery of the through hole 206. Moreover, a land 203 is provided on the front surface 201 of the board 200, at a position corresponding to the land 123 of the sensor package 100. The board 200 is an example of "an external board".

In the present embodiment, the land 122 of the sensor package 100 and the land 203 of the board 200 are connected by a solder 205. In addition, the land 123 of the sensor package 100 and the land 204 of the board 200 are connected by a solder 205. Because the land 123 is formed to a sleeve shape surrounding the periphery of the vent hole 13, and the land 204 is formed to a sleeve shape surrounding the periphery of the through hole 206, the solder 205 connecting the land 123 and the land 204 is also formed to a sleeve shape. For this reason, when the sensor package 100 placed on the board 200 is viewed from a back surface 202 of the board 200, the vent hole 13 is visible through the sleeve defined by the through hole 206 of the board 200 and the solder 205, and through the sleeve defined by the land 123. In other words, the inside of the lid 3 communicates to the outside, through the sleeve defined by the through hole 206 of the board 200 and the solder 205, and through the sleeve defined by the land 123.

According to the present embodiment, the sensor package 100 can cause the flow sensor chip 2 to detect the flow of fluid introduced into the accommodating chamber 101 from the through hole 206 and the vent hole 13, and discharged from the accommodating chamber 101 through the vent hole 33, for example. In addition, the sensor package 100 can cause the flow sensor chip 2 to detect the flow of fluid introduced into the accommodating chamber 101 from the vent hole 33, and discharged from the accommodating chamber 101 through the through hole 206 and the vent hole 13, for example. That is, the sensor package 100 can detect the flow of fluid in the thickness direction of the board 200 (normal direction to the front surface 201 of the board 200).

Figure 11:
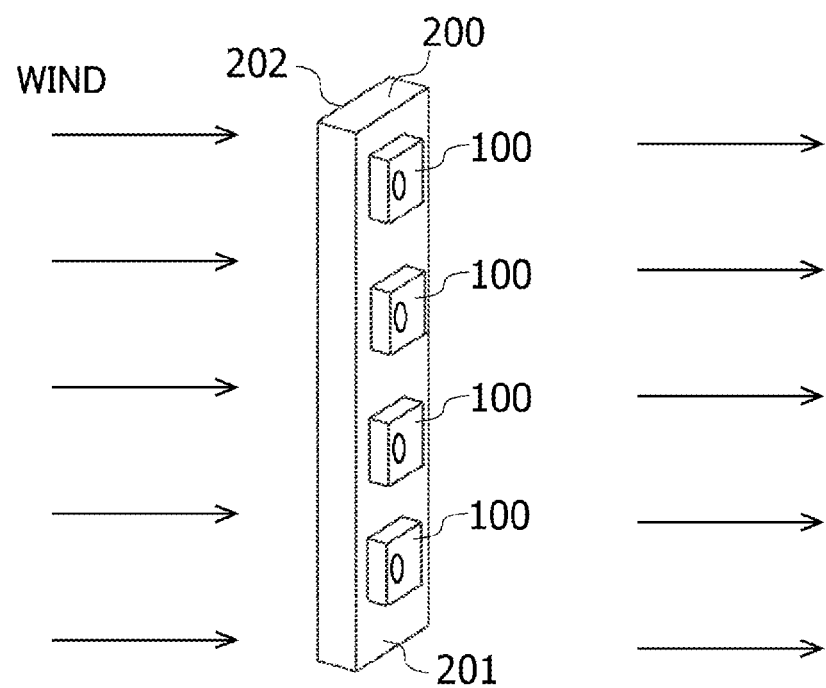
FIG. 11 is a diagram illustrating an example of a state where multiple sensor packages according to the embodiment are disposed side by side.

For example, multiple sensor packages 100 may be disposed side by side on the board 200. FIG. 11 is a diagram illustrating an example of a state where multiple sensor packages according to the embodiment are disposed side by side. In FIG. 11, the multiple sensor packages 100 are arranged side by side in a row on the front surface 201 of the board 200. By arranging the multiple sensor packages 100 side by side on the board 200 in this manner, it is possible to detect a distribution of the flow velocity of the fluid. In FIG. 11, the multiple sensor packages 100 are arranged side by side in a row, however, the sensor packages 100 may be arranged side by side in multiple rows.

(Utilization As Differential Pressure Sensor)

Figure 12:
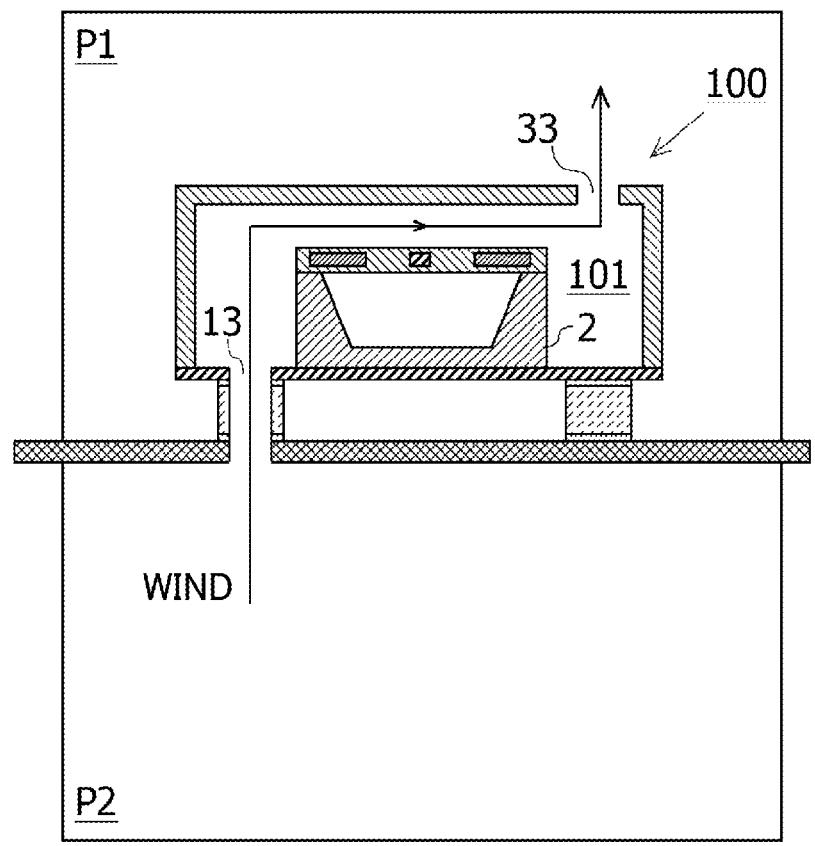
FIG. 12 is a diagram illustrating an example of a configuration utilizing the sensor package according to the embodiment as a differential pressure sensor.

The sensor package 100 may be utilized as a differential pressure sensor. FIG. 12 is a diagram illustrating an example of a configuration utilizing the sensor package according to the embodiment as a differential pressure sensor. FIG. 12 illustrates an example of the configuration that detects a pressure difference (differential pressure) between a room P1 and room P2 by the sensor package 100. The room P1 and the room P2 are partitioned by the board 200. For example, when a pressure of the room P1 becomes lower than a pressure of the room P2, a wind blows from the room P2 to the room P1 through the vent hole 13, the accommodating chamber 101, and the vent hole 33. The wind direction and the wind velocity vary according to a magnitude of the pressure difference between the room P1 and the room P2. For this reason, the sensor package 10 can detect the differential pressure between the room P1 and the room P2, by detecting the wind direction and the wind direction between the room P1 and the room P2.

<Functions and Effects of Embodiments>

The sensor package 100 according to the embodiment accommodates the flow sensor chip 2 that is placed on the board 1, inside the accommodating chamber 101. As a result, the flow sensor chip 2 is protected from physical contact or the like from the outside, by the lid 3 and the board 1. For this reason, the sensor package 100 can be handled with more ease than a flow sensor having the membrane 22 exposed to the outside. In addition, because the sensor package 100 protects the flow sensor chip 2 from the physical contact from the outside by the lid 3 and the board 1, it is possible to use the sensor package 100 at various locations.

The size of the sensor package according to the embodiment can more easily be reduced compared to a flow sensor that is integrally formed with the flow passage through which the fluid passes, because the sensor package 100 is not integrally formed with the flow passage through which the fluid passes.

The sensor package 100 according to the embodiment can form the flow passage suited for measuring the flow velocity of fluid and the flow direction of fluid, by arranging the vent hole 13, the vent hole 33, and the thermopiles 24 and 24 side by side in a row along the Y-direction.

The sensor package 100 according to the embodiment includes the vent hole 13 provided in the board 1, and the vent hole 3 provided in the lid 3. For this reason, the sensor package 100 can detect the wind flowing from the board 1 toward the top plate 31, and the wind flowing from the top plate 31 toward the board 1. That is, the sensor package 100 can detect the flow of fluid in the thickness direction of the board 200.

<First Modification>

Figure 13:
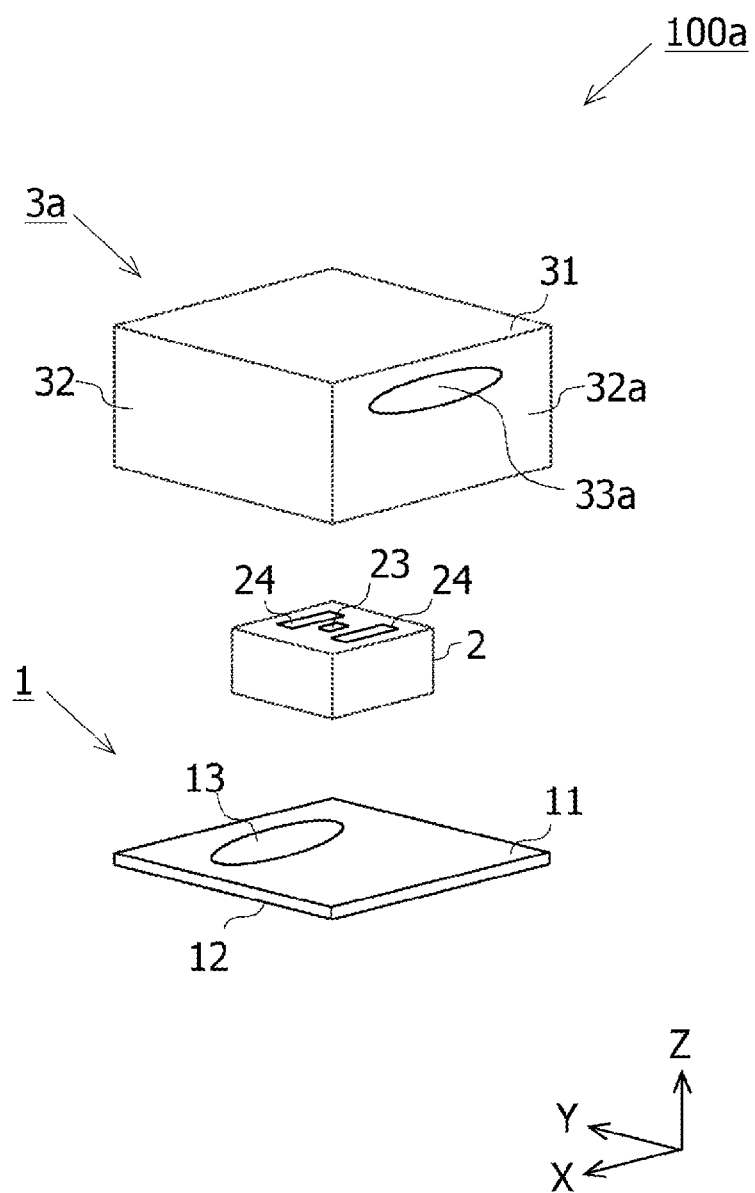
FIG. 13 is a disassembled perspective view of the sensor package according to a first modification.

The vent hole 33 is provided in the top plate 31 of the lid 3 according to the embodiment. However, the position where the vent hole 33 is provided is not limited to the top plate 31 of the lid 3. FIG. 13 is a disassembled perspective view of the sensor package according to a first modification. In a sensor package 100a according to the first modification, one of the sidewalls 32 of a lid 3a is a sidewall 32a provided with a vent hole 33a.

Figure 14:
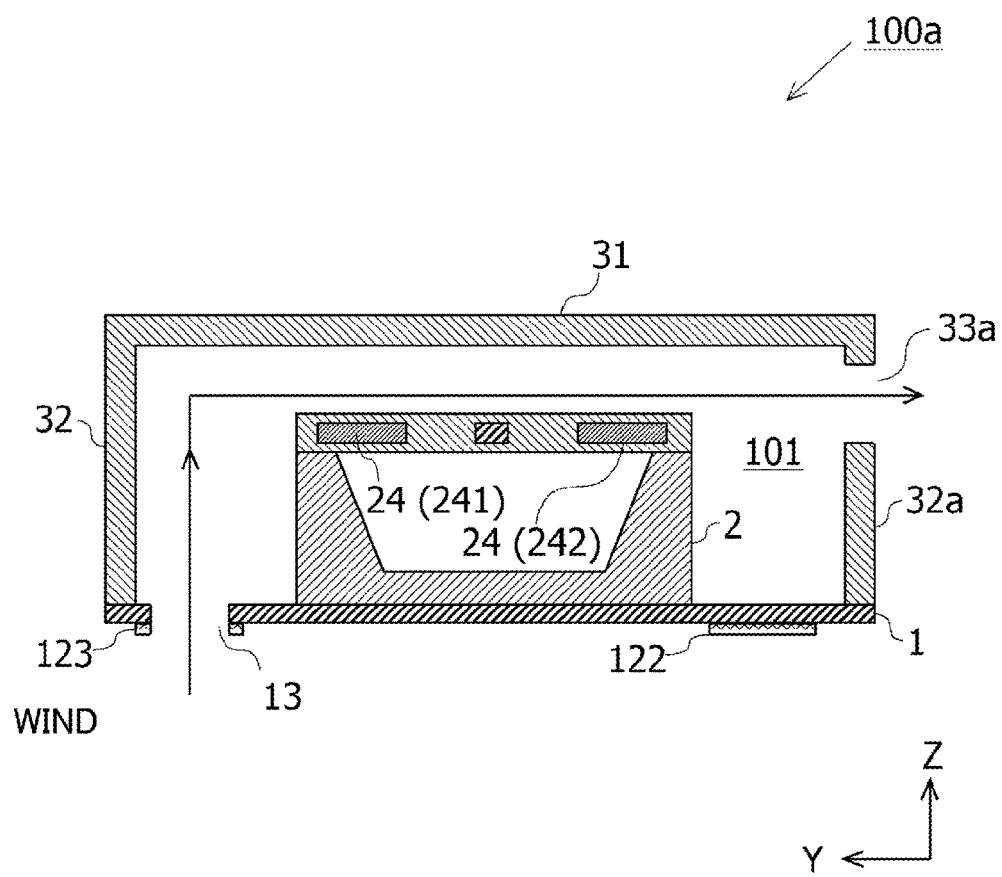
FIG. 14 is a diagram schematically illustrating the flow of air introduced from the vent hole, in the sensor package according to the first modification.

FIG. 14 is a diagram schematically illustrating the flow of air introduced from the vent hole, in the sensor package according to the first modification. In the sensor package 100a according to the first modification, the vent hole 33a is provided in the sidewall 32a of the lid 3. This sensor package 100a can also detect the wind flowing from the back surface 12 of the board 1 toward the lid 3. For example, in the example of the configuration illustrated in FIG. 10, the sensor package 100a may be employed in place of the sensor package 100, so that the sensor package 100a can detect the flow of fluid in the thickness direction of the board 200.

<Second Modification>

Figure 15:
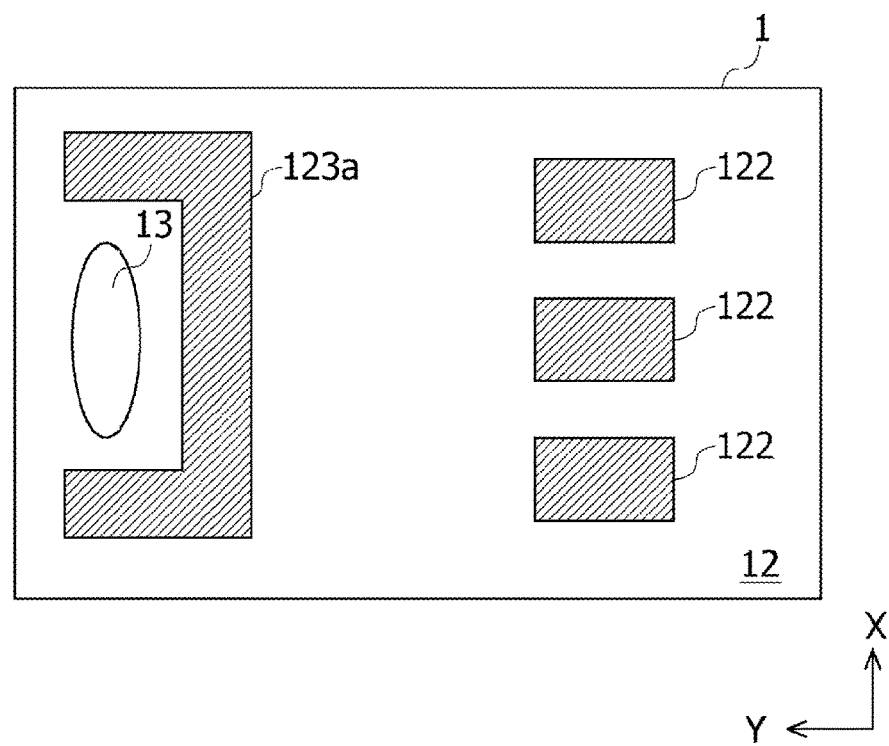
FIG. 15 is a diagram illustrating the board of a sensor package 100 according to a second modification viewed from a back surface thereof.

In the sensor package 100 according to the embodiment, the land 123 is provided to surround the periphery of the vent hole 13 at the back surface 12 of the board 1. However, at least a portion of the periphery of the vent hole 13 does not need to be surrounded by the land. FIG. 15 is a diagram illustrating the board of the sensor package 100b according to a second modification viewed from the back surface thereof. A sensor package 100b according to the second modification includes a land 123a having an approximate U-shape provided at the back surface 12 of the board 1.

Figure 16:
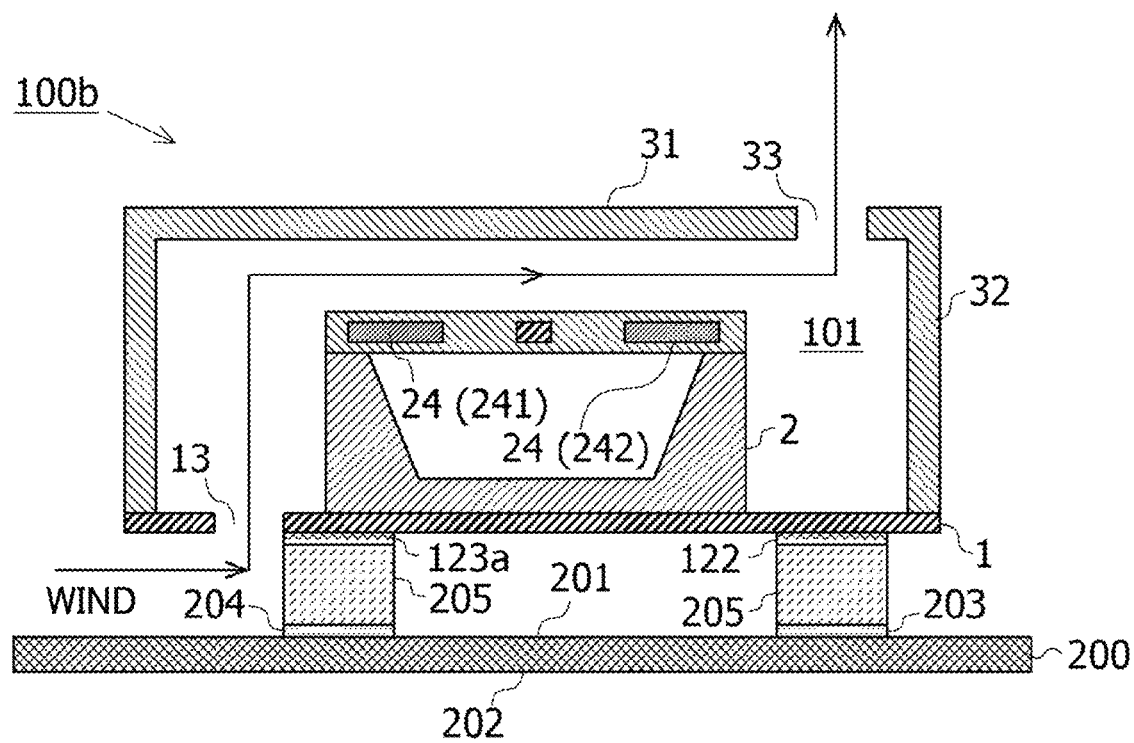
FIG. 16 is a diagram schematically illustrating the flow of air introduced from the vent hole, in the sensor package according to the first modification.
Figure 16:
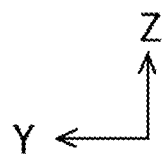

FIG. 16 is a diagram schematically illustrating the flow of air introduced from the vent hole, in the sensor package according to the second modification. In the sensor package 100b, the land 123a can guide the wind flowing parallel to the front surface 201 of the board 200 to the vent hole 13. For this reason, the sensor package 100b can detect the wind flowing parallel to the front surface 201 of the board 200 with a high sensitivity. Although the lad 123a is provided for the purposes of physically and electrically connecting the sensor package 100b and the board 200 by the solder 205, the land 123a may be provided primarily for the purposes of forming the flow passage by the solder, and in this latter case, the land 123a does not have the electrically connecting function.

<Third Modification>

Figure 17:
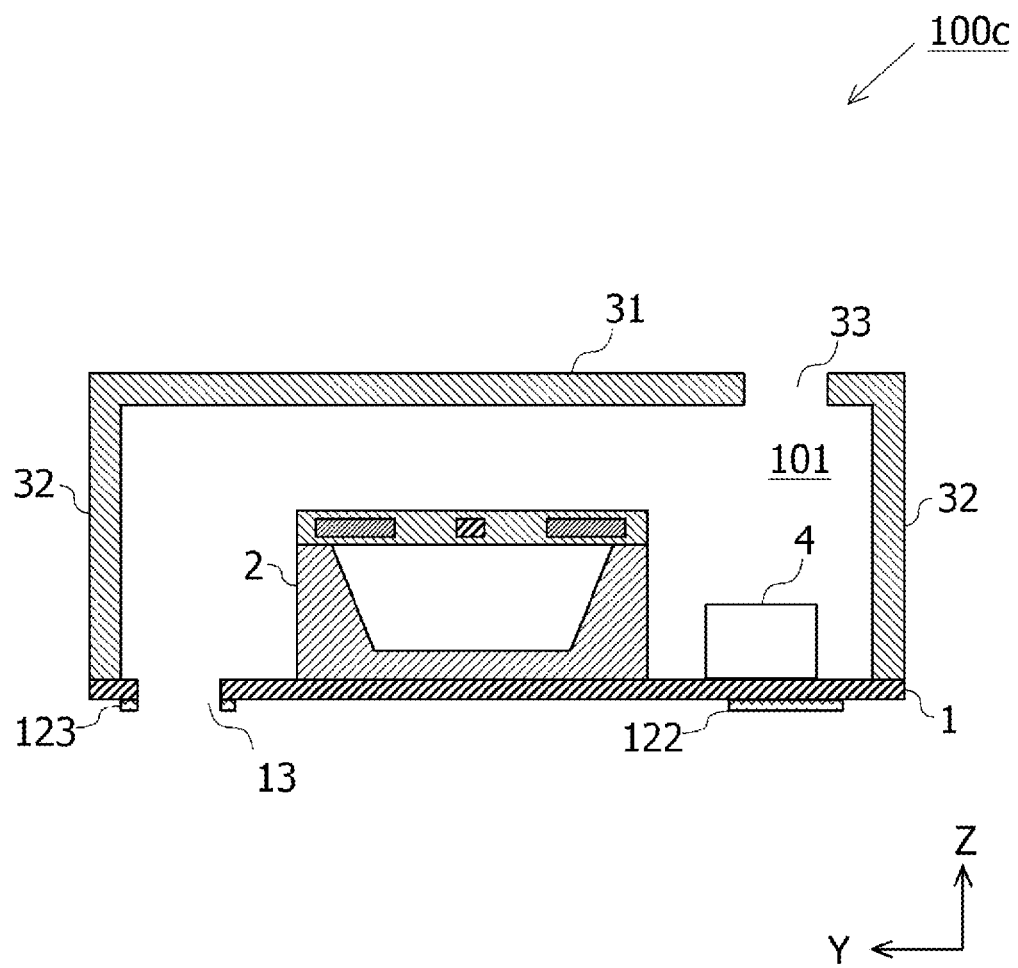
FIG. 17 is a diagram illustrating an example of the sensor package according to a third modification.

In the sensor package, the board 1 may be mounted with other electronic components, in addition to the flow sensor chip 2. FIG. 17 is a diagram illustrating an example of the sensor package according to a third modification. A sensor package 100c according to the third modification includes an electronic component 4 mounted on the board 1, in addition to the flow sensor chip 2. The electronic component 4 may be an arbitrary electronic component. For example, the electronic component 4 may be a charge pump configured to boost and supply a voltage supplied from the outside to the flow sensor chip 2, or an amplifier configured to amplify an output of the flow sensor chip 2. The flow sensor chip 2 and the electronic component 4 may be connected by wires, or may be connected by interconnects provided on the board 1. By mounting the electronic component 4 on the board 1 inside the accommodating chamber 101, it is possible to reduce a noise mixing into the interconnect between the flow sensor chip 2 and the electronic component 4, thereby improving the performance of the sensor package 100c.

<Fourth Modification>

Figure 18:
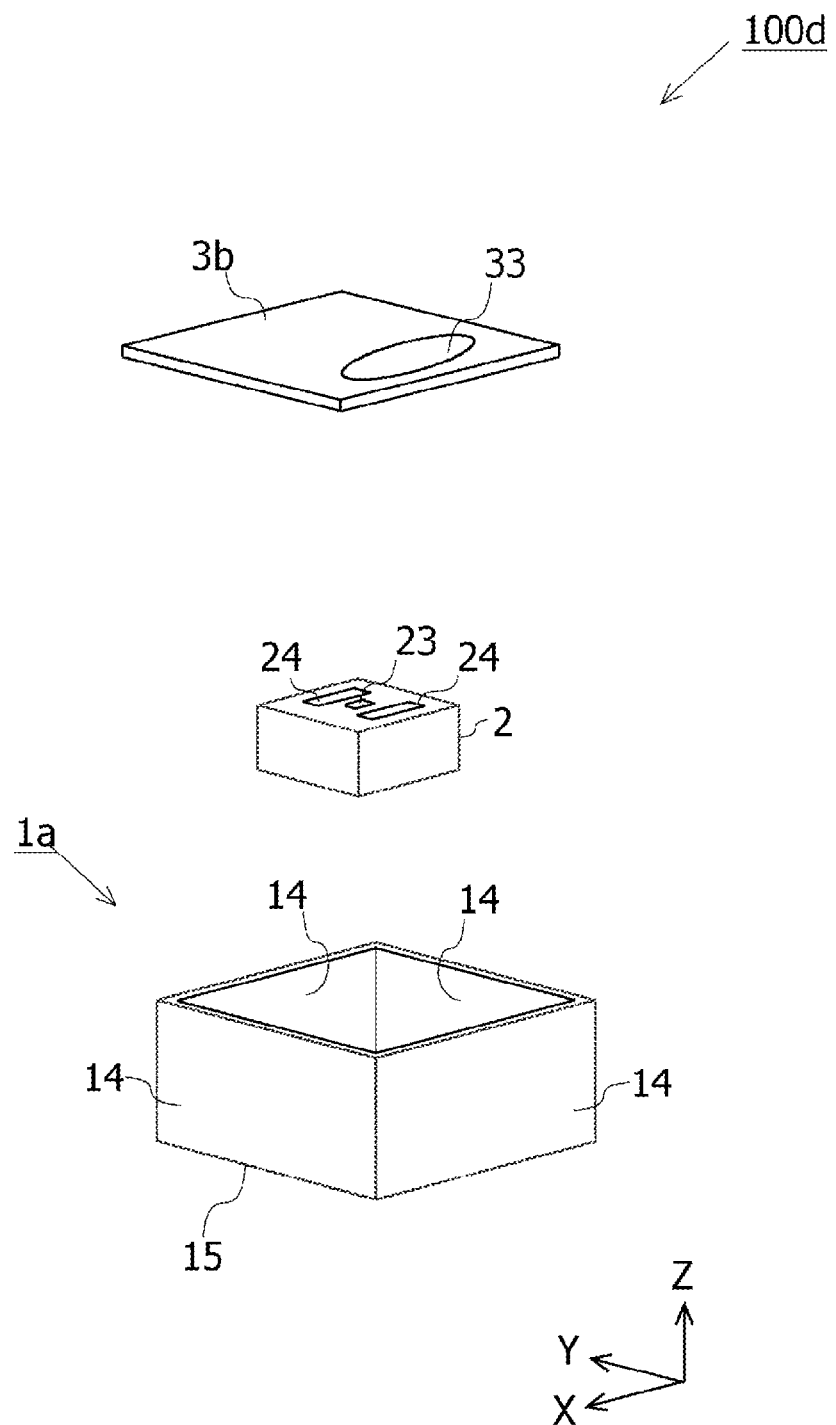
FIG. 18 is a disassembled perspective view of the sensor package according to a fourth modification.
Figure 19:
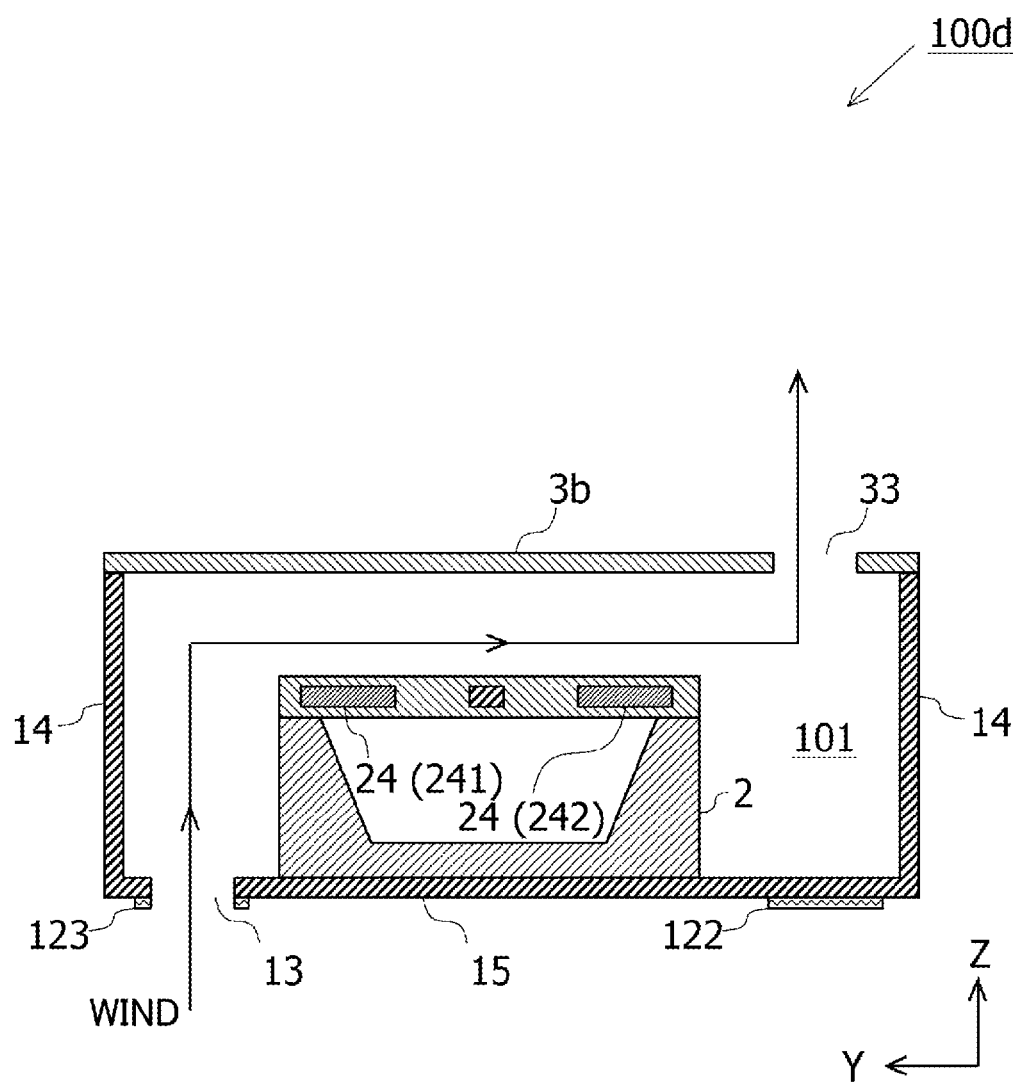
FIG. 19 is a diagram schematically illustrating the flow of air from the vent hole, in the sensor package according to the fourth modification.

In the first modification through the third modification of the embodiment, the lid 3 is formed to the box shape, and the board 1 is formed to the flat shape. However, the lid 3 may be formed to a flat shape, and the board 1 may be formed to a box shape. FIG. 18 is a disassembled perspective view of the sensor package according to a fourth modification. In addition, FIG. 19 is a diagram schematically illustrating the flow of air from the vent hole, in the sensor package according to the fourth modification. In a sensor package 100d according to the fourth modification, a lid 3b is formed to the flat shape. In addition, a board 1a is formed to a hollow parallelepiped shape by a flat bottom plate 15, and flat sidewalls 14 extending from an edge of the bottom plate 15. The board 1a may be formed to a box shape that opens toward the lid 3a. The board 1a can accommodate the flow sensor chip 2 in a hollow region thereof. The vent hole 13, that penetrates the bottom plate 15 in a thickness direction, is provided in the bottom plate 15 of the board 1a. The accommodating chamber 101 for accommodating the flow sensor chip 2 can also be formed by the board 1a and the lid 3b described above. The sensor package 100d according to the fourth modification can also detect the wind from the board 1a toward the lid 3b, and the wind from the lid 3b toward the board 1a, similar to the sensor package 100 according to the embodiment. The bottom plate 15 is an example of "a board part".

Figure 20:
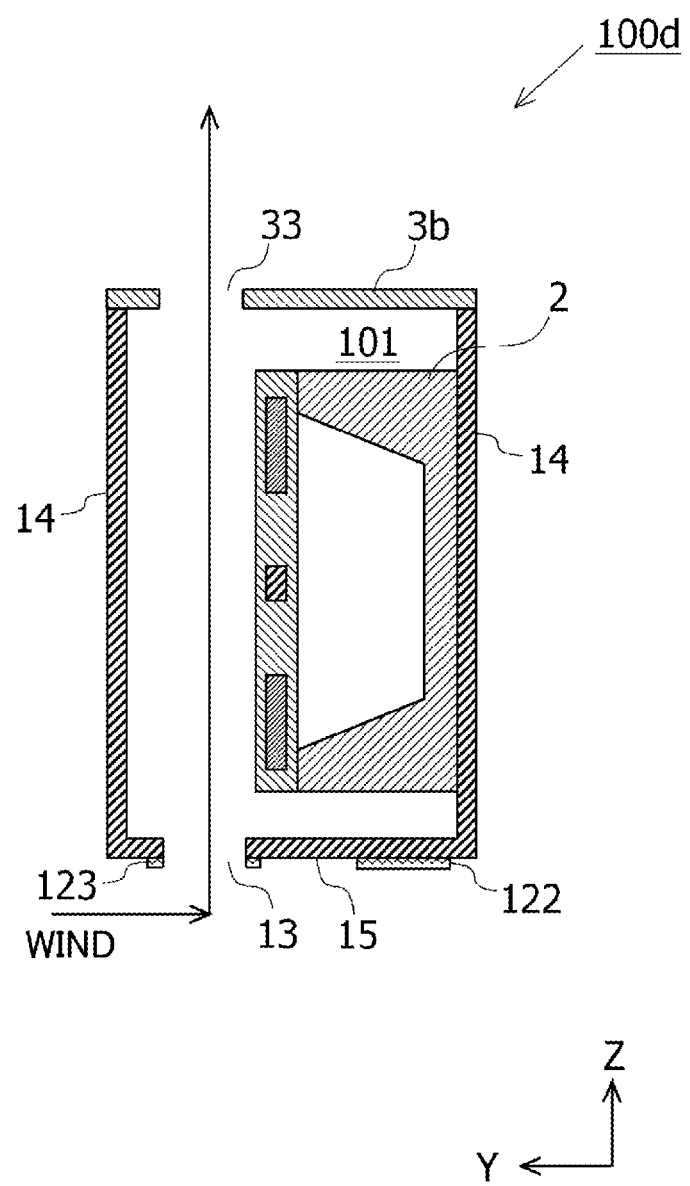
FIG. 20 is a diagram illustrating an example of a configuration in which the flow sensor chip is placed on a sidewall of a board formed to a box shape, in the fourth modification.

In the case of the board 1a formed to the box shape, the electronic component can be mounted on the sidewall 14, other than the bottom plate 15. For this reason, the fourth modification can plate the flow sensor chip 2 on the sidewall 14 of the board 1a. FIG. 20 is a diagram illustrating an example of a configuration in which the flow sensor chip is placed on the sidewall of the board formed to the box shape, in the fourth modification. As illustrated in FIG. 20, the location where the flow sensor chip 2 is mounted may be the sidewall 14, as long as the location is situated on the flow passage formed by the vent hole 13, the vent hole 33, and the accommodating chamber 101.

The present embodiment includes the following exemplary implementation (called appended clause).

<Appended Clause 1>

A package-type flow sensor (100) comprising:
a flow sensor chip (2) having a sensor part configured to detect a flow of fluid;
a package (3, 1) including a flat board part (1, 15), forming an accommodating chamber (101) configured to accommodate the flow sensor chip (2); and
a connection terminal (123), provided on an outer surface of the board part (1, 15), and connected to an external board (200), wherein
the board part (1, 15) is provided with a first vent hole (13) communicating to inside and outside of the accommodating chamber (101),
the package is provided with a second vent hole (33) communicating to the inside and the outside of the accommodating chamber (101), at a position different from the board part (1, 15), and
the flow sensor chip (2) is disposed on a flow passage of the fluid formed by the first vent hole (13) and the second vent hole (33).

The embodiments and the modifications disclosed above may be combined, respectively.

DESCRIPTION OF THE REFERENCE NUMERALS 100, 100a, 100b, 100c, 100d Sensor package
1, 1a, 200 Board
11, 201 Front surface
112 Feeding terminal
113 Measuring terminal
12, 12a, 202 Back surface
2 Flow sensor chip
21 Main body
22 Membrane
23 Heater
231 Fed terminal
24, 241, 242 Thermopile
243 Measured terminal
3, 3a, 3b Lid
13, 33, 33a Vent hole
205 Solder
W1 Metal wire

The invention claimed is:

1. A package-type flow sensor comprising:
a flow sensor chip having a sensor part configured to detect a flow of fluid;
a package including a flat board part, forming an accommodating chamber configured to accommodate the flow sensor chip; and
a connection terminal, provided on an outer surface of the board part, and connected to an external board, wherein
the board part is provided with a first vent hole communicating to inside and outside of the accommodating chamber,
the package is provided with a second vent hole communicating to the inside and the outside of the accommodating chamber, at a position different from the board part,
the flow sensor chip is disposed on a flow passage of the fluid formed by the first vent hole and the second vent hole,
the connection terminal is formed to surround a periphery of the first vent hole,
a through hole is formed through the external board at a position corresponding to an area surrounded by the connection terminal,
the connection terminal and a land, which is formed to surround the through hole, are connected by a solder, the solder forming a pathway to communicate the first vent hole and the through hole, and
the fluid is guided from a back surface of the external board to the accommodating chamber via the through hole and the first vent hole, the back surface of the external board being opposite to a front surface of the external board that is mounted with the package.

2. The package-type flow sensor as claimed in claim 1, wherein the package-type flow sensor is placed on the front surface of the external board which is mounted with an electronic component.

3. The package-type flow sensor as claimed in claim 1, wherein
the package includes a case member forming a hollow part opening to an outside by a top plate and sidewalls extending from an edge of the top plate,
the accommodating chamber is formed by closing the opening by the board part, and
the second vent hole is provided in the case member.

4. The package-type flow sensor as claimed in claim 3, wherein the second vent hole is formed in the top plate.

5. The package-type flow sensor as claimed in claim 3, wherein the second vent hole is formed in one of the sidewalls.

6. The package-type flow sensor as claimed in claim 1, wherein a charge pump configured to boost and supply a voltage supplied from outside to the flow sensor chip is further accommodated in the accommodating chamber.

7. The package-type flow sensor as claimed in claim 1, wherein an amplifier configured to amplify an output of the flow sensor chip is further accommodated in the accommodating chamber.

\* \* \* \* \*